United States Patent
Parker et al.

(10) Patent No.: US 11,814,306 B2
(45) Date of Patent: Nov. 14, 2023

(54) MULTILAYERED ELECTROLYTE COMPOSITIONS AND METHODS FOR THEIR PREPARATION AND USE

(71) Applicant: PurLyte LLC, LaGrange, GA (US)

(72) Inventors: John Benjamin Parker, Athens, GA (US); Lee Christopher Brackman, Athens, GA (US); Nicholas Ruffin Delbert-Robertson, Athens, GA (US)

(73) Assignee: PURLYTE LLC, LaGrange, GA (US)

( * ) Notice: Subject to any disclaimer, the term of this patent is extended or adjusted under 35 U.S.C. 154(b) by 151 days.

(21) Appl. No.: 17/172,895

(22) Filed: Feb. 10, 2021

(65) Prior Publication Data
US 2021/0246052 A1 Aug. 12, 2021

Related U.S. Application Data
(60) Provisional application No. 62/972,271, filed on Feb. 10, 2020.

(51) Int. Cl.
*C02F 1/50* (2023.01)
*C02F 101/12* (2006.01)
*C02F 103/06* (2006.01)

(52) U.S. Cl.
CPC .......... *C02F 1/50* (2013.01); *C02F 2101/12* (2013.01); *C02F 2103/06* (2013.01); *C02F 2303/04* (2013.01); *C02F 2305/14* (2013.01)

(58) Field of Classification Search
None
See application file for complete search history.

(56) References Cited

U.S. PATENT DOCUMENTS

| | | | |
|---|---|---|---|
| 8,955,536 | B2 | 2/2015 | Bell et al. |
| 2004/0259748 | A1 | 12/2004 | Wiedemann et al. |
| 2005/0040116 | A1* | 2/2005 | Purdy .................. C02F 1/688 210/749 |
| 2005/0214613 | A1* | 9/2005 | Sarkar ................ H01M 4/8621 429/495 |
| 2011/0171283 | A1 | 7/2011 | Riesinger |
| 2015/0321929 | A1* | 11/2015 | Legzdins ............ C02F 1/46114 210/243 |

(Continued)

FOREIGN PATENT DOCUMENTS

| | | |
|---|---|---|
| RU | 2299862 C2 | 5/2007 |
| WO | 1998007809 A2 | 2/1998 |

(Continued)

OTHER PUBLICATIONS

Clasen et al., "Sodium Dichloroisocyanurate (NaDCC) Tablets as an Alternative to Sodium Hypochlorite for the Routine Treatment of Drinking Water at the Household Level", Int. J. Hyg. Environ.-Health, Mar. 2006, 209:173-181.

(Continued)

*Primary Examiner* — John J Figueroa
(74) *Attorney, Agent, or Firm* — Troutman Pepper Hamilton Sanders LLP (Rochester)

(57) ABSTRACT

Multilayered electrolyte compositions and methods for their manufacture and use are described. The compositions can have an inner core and one or more coating layers. The compositions can contain at least one chlorine source and at least one citrate salt. The compositions are useful for treating water to improve safety, among other things.

25 Claims, 10 Drawing Sheets

(56) References Cited

U.S. PATENT DOCUMENTS

2017/0312301 A1  11/2017  Saeki et al.

FOREIGN PATENT DOCUMENTS

| WO | 2013084072 A2 | 6/2013 |
| WO | 2016079265 A1 | 5/2016 |
| WO | 2016079266 A1 | 5/2016 |
| WO | 2020014612 A1 | 1/2020 |

OTHER PUBLICATIONS

Notification, International Search Report and Written Opinion for PCT/US2021/017462 dated Jun. 15, 2021.

* cited by examiner

MULTILAYERED ELECTROLYTE COMPOSITIONS AND METHODS FOR THEIR PREPARATION AND USE

CROSS-REFERENCE TO RELATED APPLICATIONS

This application claims priority to U.S. Provisional Patent Application Ser. No. 62/972,271, which was filed on Feb. 10, 2020, entitled SYSTEM AND PROCESS FOR TIME-DELAYED RELEASE OF SOLUTES INTO DRINKING WATER, the contents of which is incorporated in its entirety by reference.

BACKGROUND

Many water treatment methods exist, each having their own benefits and drawbacks. Heating is effective but slow due to heating and cooling time and requires considerable energy input. Ultraviolet light is effective but requires electricity and is only effective with clear liquids. Membrane filtration is prone to clogging if the untreated water has suspended particulates. Chemical methods such as iodine and chlorine are effective, but usually leave the treated water with an unpleasant taste and odor, such as an undesirable bleach smell and taste.

Sodium dichloroisocyanurate ("NaDCC") is an effective water treatment, reacting with both organic and inorganic compounds in water. The concentration of compounds in the water corresponds to a "chlorine demand" of the water. Any remaining NaDCC available for additional disinfection is referred to as Free Chlorine Residual ("FCR"). To effectively neutralize more than 99.99% (four "nines") of bacteria, viruses, and protozoa in water, NaDCC preferably has a Free Chlorine Residual (FCR) level of at least about 0.5 mg/L for at least 30 minutes according to various government guidelines. Unfortunately, water having a high FCR level is unpalatable due to a chlorine taste and smell.

Despite advances made to date in water treatment and purification, there still exists a need for efficient compositions and methods to treat water sources and add electrolytes to the potable product.

SUMMARY

In one embodiment, multilayered compositions are described. The multilayered electrolyte composition can generally comprise a core layer, an inert layer, and a disinfection layer, wherein: the core layer comprises at least one citrate salt; the inert layer does not chemically react with at least one water disinfection agent; and the disinfection layer comprises the at least one water disinfection agent.

In an additional embodiment, a multilayered electrolyte composition is described. The multilayered electrolyte composition can generally comprise a core layer, a first coating layer, and a disinfection layer, wherein: the core layer comprises sodium chloride, potassium chloride, trisodium citrate dihydrate, and a colored dye; the inert layer comprises glucose; and the disinfection layer comprises sodium dichloroisocyanurate and an effervescent agent.

In another embodiment, methods of preparing multilayered compositions are described. The methods can generally comprise providing a core layer composition comprising at least one citrate salt; providing an inert layer composition that does not chemically react with at least one water disinfection agent; providing a second coating layer composition comprising the at least one water disinfection agent; forming a core layer from the core layer composition; coating the core layer with the inert layer composition to form an inert layer; and coating the inert layer with the disinfection layer composition to form a disinfection layer.

In a further embodiment, methods of using multilayered compositions are described. The methods can generally include providing a multilayered electrolyte composition; and contacting the multilayered electrolyte composition with untreated water to form treated water; wherein: the multilayered electrolyte composition comprises a core layer, an inert layer, and a disinfection layer; the core layer comprises at least one citrate salt; the inert layer does not chemically react with at least one water disinfection agent; and the disinfection layer comprises the at least one water disinfection agent.

BRIEF DESCRIPTION OF THE DRAWINGS

| The following table indicates the element numbers in the Figures. | |
|---|---|
| Figure Element | Description |
| 10 | Core layer |
| 20 | Inert layer |
| 30 | Disinfection layer |
| 40 | Sealant layer |
| 50 | Moisture barrier layer |

DEFINITIONS

Figure 1:
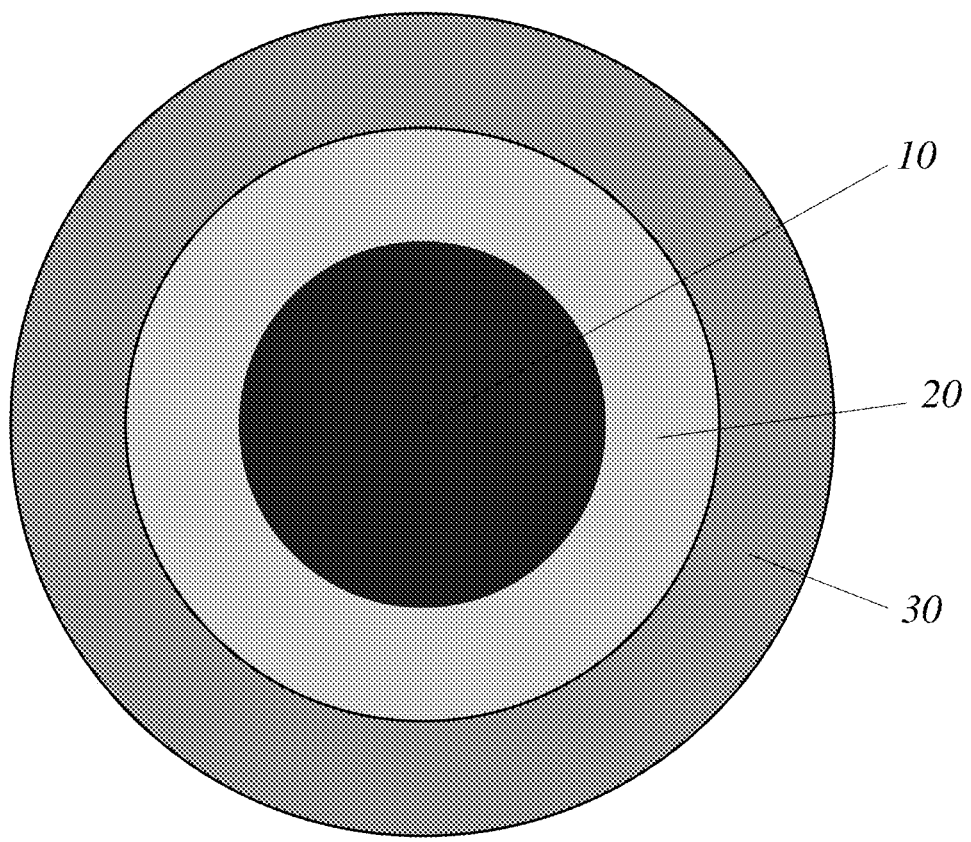
FIG. 1 shows a cross section of a spherical tablet having a core layer 10, inert layer 20, and disinfection layer 30.
Figure 2:
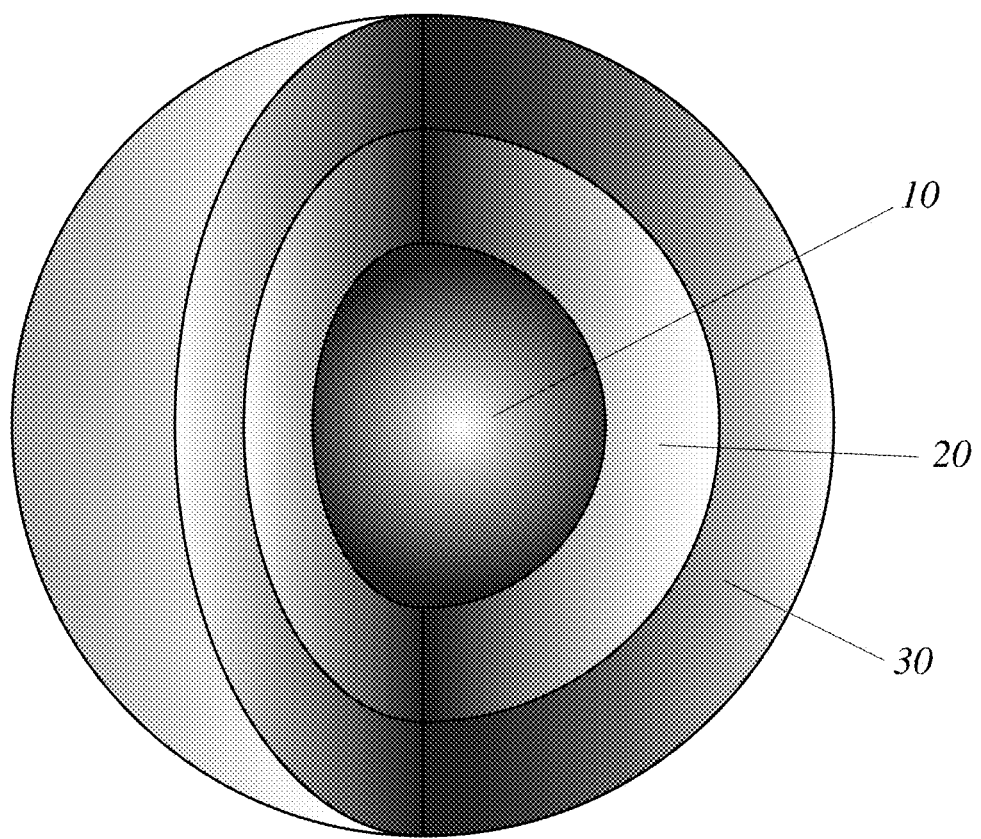
FIG. 2 shows a cut-away view of a spherical tablet having a core layer 10, inert layer 20, and disinfection layer 30.
Figure 3:
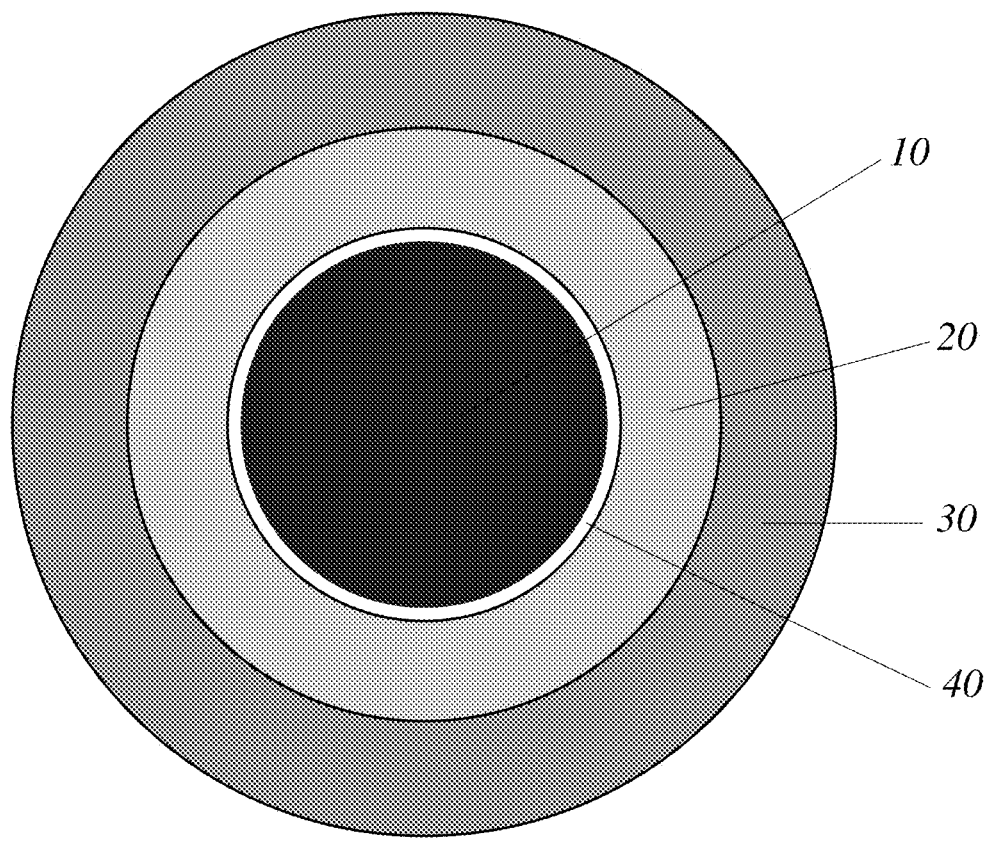
FIG. 3 shows a cross section of a spherical tablet having a core layer 10, sealant layer 40, inert layer 20, and disinfection layer 30.
Figure 4:
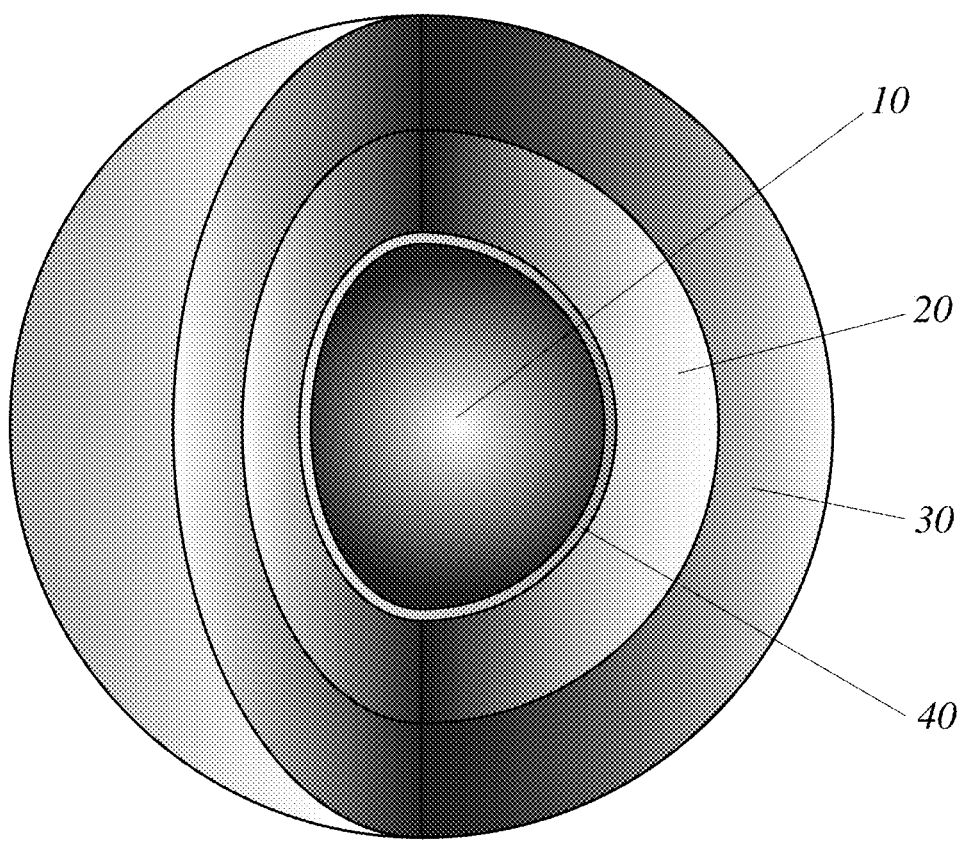
FIG. 4 shows a cut-away view of a spherical tablet having a core layer 10, sealant layer 40, inert layer 20, and disinfection layer 30.
Figure 5:
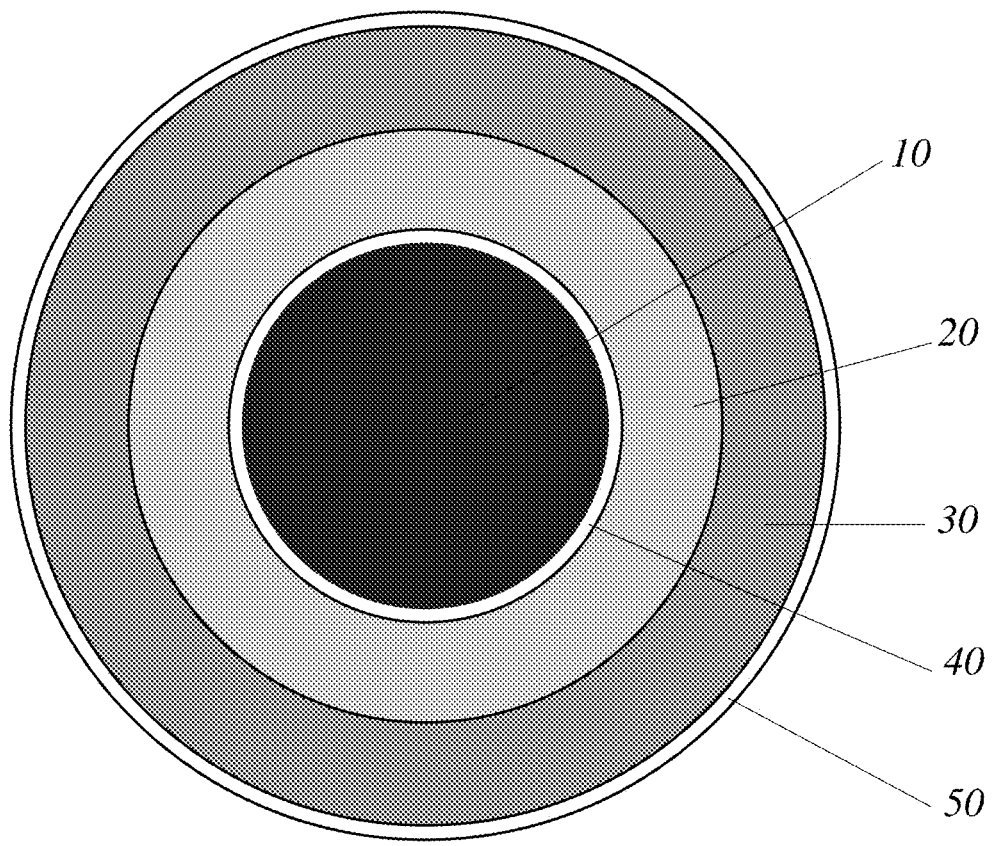
FIG. 5 shows a cross section of a spherical tablet having a core layer 10, sealant layer 40, inert layer 20, disinfection layer 30, and moisture barrier layer 50.
Figure 6:
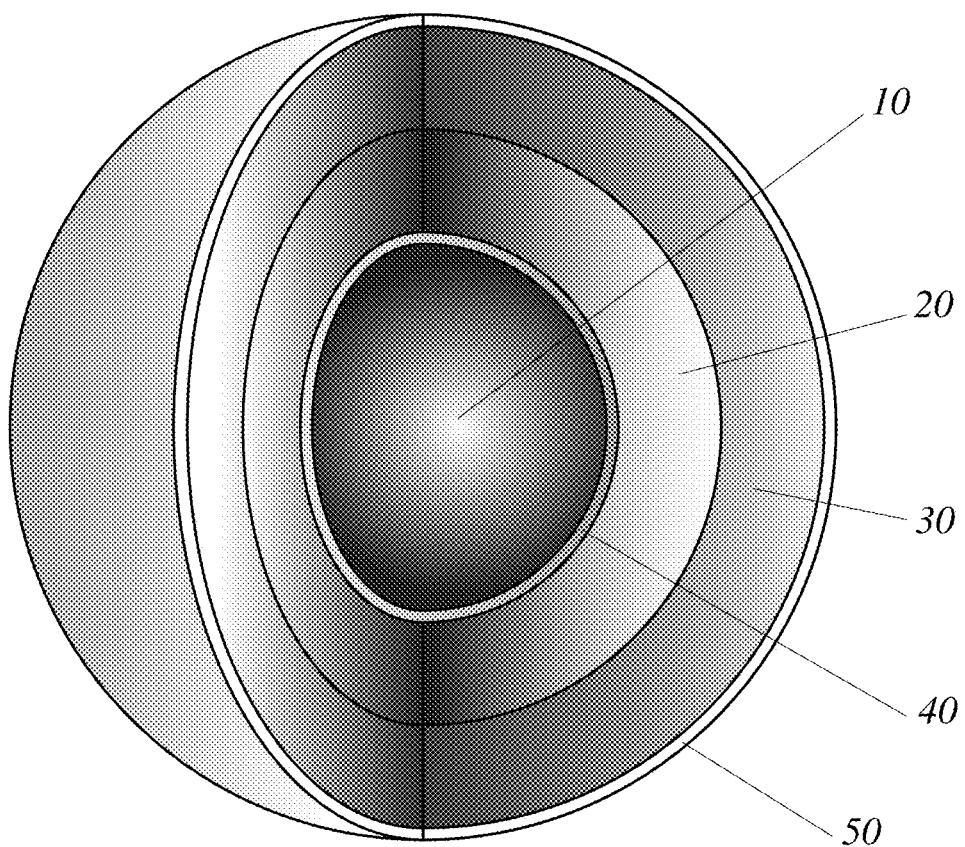
FIG. 6 shows a cut-away view of a spherical tablet having a core layer 10, sealant layer 40, inert layer 20, disinfection layer 30, and moisture barrier layer 50.
Figure 7:
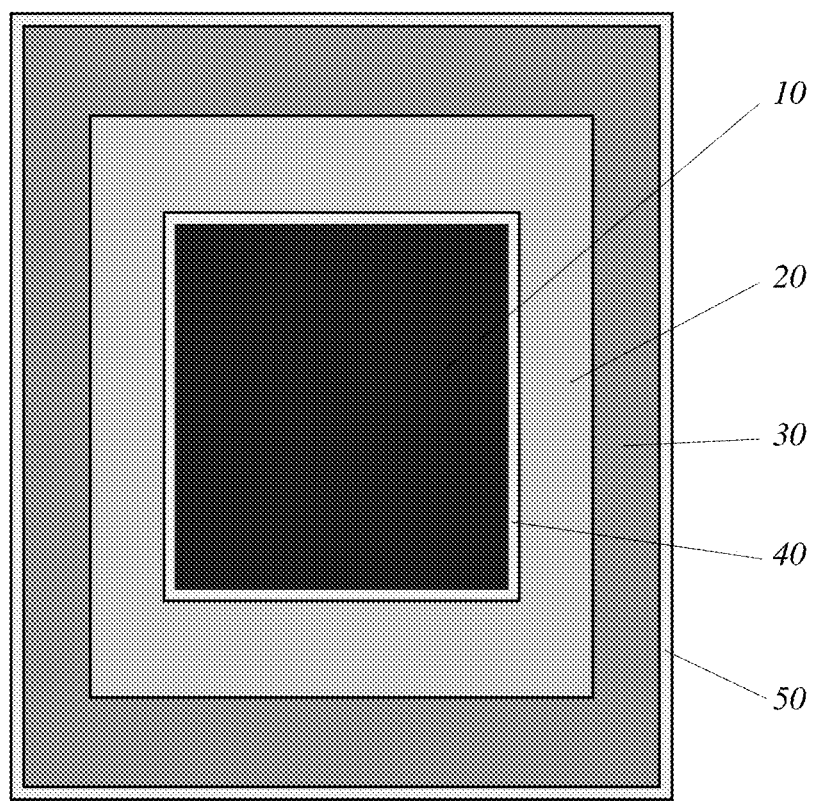
FIG. 7 shows a cross section of a cylindrical tablet having a core layer 10, sealant layer 40, inert layer 20, disinfection layer 30, and moisture barrier layer 50.
Figure 8:
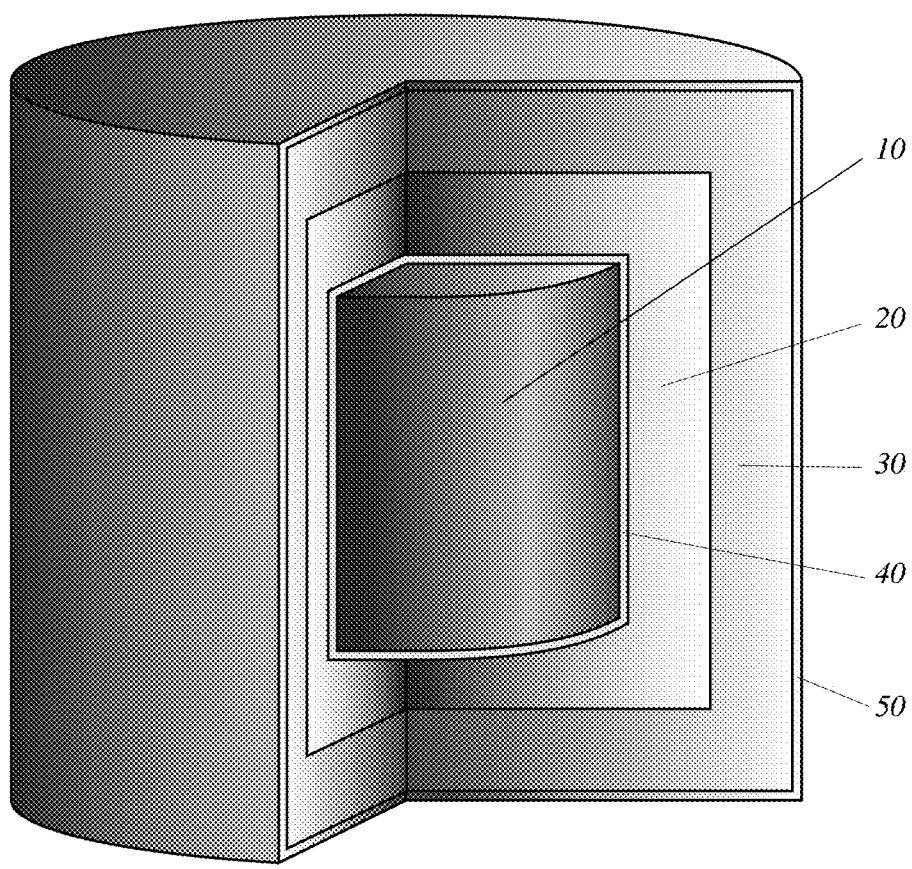
FIG. 8 shows a cut-away view of a cylindrical tablet having a core layer 10, sealant layer 40, inert layer 20, disinfection layer 30, and moisture barrier layer 50.
Figure 9:
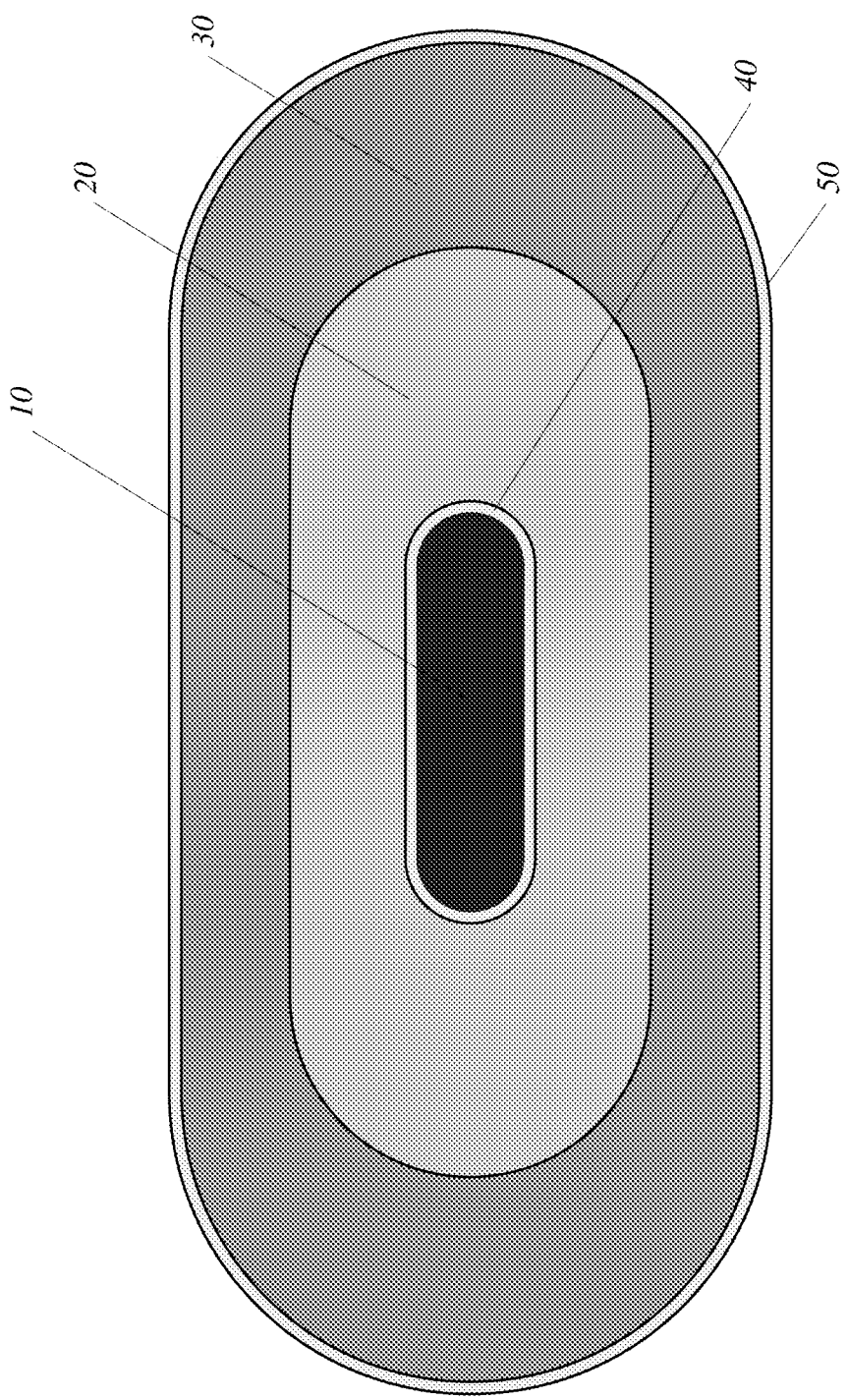
FIG. 9 shows a cross section of an oblong tablet having a core layer 10, sealant layer 40, inert layer 20, disinfection layer 30, and moisture barrier layer 50.
Figure 10:
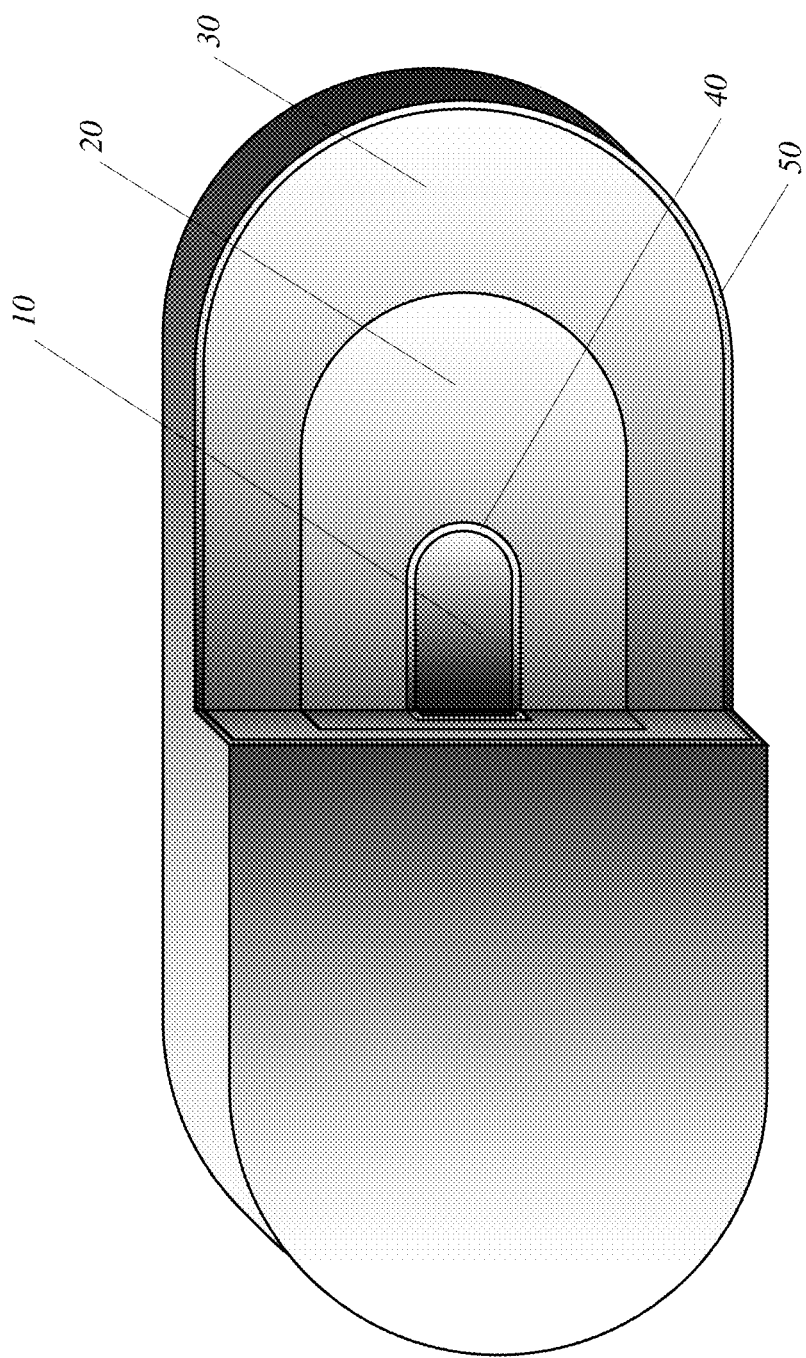
FIG. 10 shows a cut-away view of an oblong tablet having a core layer 10, sealant layer 40, inert layer 20, disinfection layer 30, and moisture barrier layer 50.

As used herein, the term "about" when immediately preceding a numerical value means a range of plus or minus 10% of that value, for example, "about 50" means 45 to 55, "about 25,000" means 22,500 to 27,500, etc., unless the context of the disclosure indicates otherwise, or is inconsistent with such an interpretation.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

DETAILED DESCRIPTION

This disclosure is not limited to the particular systems, devices, and methods described, as these may vary. The terminology used in the description is for the purpose of describing the particular versions or embodiments only and is not intended to limit the scope.

Multilayered Electrolyte Compositions

Many multilayered electrolyte compositions are described. The compositions are useful to treat water suspected of containing or containing microbes or pathogens, while also adding at least one electrolyte to the water. The compositions can comprise a core layer and one or more coating layers.

An example of a multilayered electrolyte composition can comprise a core layer, an inert layer, and a disinfection layer, wherein: the core layer comprises at least one citrate salt; the inert layer that does not chemically react with at least one water disinfection agent; and the disinfection layer comprises the at least one water disinfection agent.

The inert layer can facially contact the core layer. The disinfection layer can facially contact the inert layer. In some examples, the disinfection layer does not contact the core layer. For example, the inert layer can facially contact the core layer, and the disinfection layer facially contacts the inert layer but not the core layer. In various examples, facially contacting can include fully coating the other layer, or partially coating the other layer. For example, the inert layer can fully coat the core layer. The disinfection layer can fully coat the inert layer.

The citrate salt can generally be any citrate salt. For example, the citrate salt can be monosodium citrate, disodium citrate, trisodium citrate, or combinations thereof. In some examples, the citrate salt is trisodium citrate. The citrate salt can be a hydrate.

The inert layer is chemically inert or does not chemically react with respect to the at least one water disinfection agent in the disinfection layer. For example, the inert layer can include at least one sugar. The sugar can generally be any sugar, such as a water-soluble sugar, glucose, sucrose, fructose, galactose, or combinations thereof. In some examples, the sugar is glucose. While not wishing to be bound by theory, gradual dissolving of the inert layer acts as a "time delay" to provide a sufficient time period for the water disinfection agent to act upon the water before the contents of the core layer are released into the water. The citrate salt in the core layer is believed to react with the water disinfection agent, effectively neutralizing any remaining active water disinfection agent.

The water disinfection agent can generally be any water disinfection agent. The water disinfection agent can reduce concentrations of microbes, pathogens, or both in water. Examples of water disinfection agents include sodium dichloroisocyanurate, sodium hypochlorite, chlorine dioxide, or combinations thereof. In some examples, the water disinfection agent is sodium dichloroisocyanurate. For example, sodium dichloroisocyanurate acts as a source of free available chlorine in the form of hypochlorous acid.

In some examples, the disinfection layer can further comprise at least one effervescent agent. The effervescent agent can help to disperse the water disinfection agent in water. The effervescent agent can generally be any effervescent agent. Examples of effervescent agents include adipic acid, sodium bicarbonate, citric acid, malic acid, tartaric acid, fumaric acid, sodium bicarbonate, sodium carbonate, potassium carbonate, and arginine carbonate.

The core layer can further comprise one or more additional components. For example, the core layer can further comprise at least one vitamin, at least one amino acid, at least one colored dye, or at least one effervescent agent.

The vitamin can generally be any vitamin. Examples of vitamins include Vitamin C, Vitamin B12, Vitamin B6, and Vitamin B3.

The amino acid can generally be any amino acid. Examples of amino acids include alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine.

The colored dye can generally be any colored dye. Examples of colored dyes include FD&C Blue No. 1-Brillian Blue FCF, E133 (blue shade), FD&C Blue No. 2-Indigotine, E132 (indigo shade), FD&C Green No. 3-Fast Green FCF, E143 (turquoise shade), FD&C Red No. 40-Allura Red AC, E129 (red shade), FD&C Yellow No. 5-Tartrazine, E102 (yellow shade), and FD&C Yellow No. 6-Sunset Yellow FCF, E110 (orange shade). The dyes can be food-safe dyes, safe for human ingestion, and/or GRAS certified.

In some examples, the core layer can further comprise at least one mineral. Examples of minerals include magnesium, zinc, phosphorous, iron, iodine, selenium, copper, manganese, fluoride, chromium, cobalt, sulfur, and combinations thereof.

In some examples, the core layer can further comprise sodium bicarbonate, potassium carbonate, sodium carbonate, arginine carbonate, ascorbic acid, citric acid, malic acid, tartaric acid, fumaric acid, or combinations thereof. In other examples, the core layer can further comprise caffeine, at least one excipient, at least one binding agent, at least one lubricant, at least one flavor additive, at least one antioxidant, at least one mineral, or combinations thereof.

The composition can generally have any shape. Example shapes include cylindrical, spherical, oblong, or spheroid shapes. The composition can have generally any dimensions. For a spherical shape, a measurable dimension is the diameter. Dimensions and overall volume may be selected according to the volume of water to be treated with the composition. A dimension may be selected according to the container holding the volume of water. For example, the composition may have a dimension to allow insertion through the opening of the container. Example maximum dimensions include about 5 mm, about 10 mm, about 15 mm, about 20 mm, about 25 mm, and ranges between any two of these values. For example, the maximum dimension can be about 10 mm to about 20 mm, or about 15 mm to about 25 mm. Common water bottles have an opening of about 20 mm, so the composition can be sized to have a dimension less than about 20 mm. For a spherical shape, the diameter can be, for example, about 10 mm to about 20 mm. This diameter is suitable for inserting the composition into a small to medium sized bottle (such as a 500 mL, 1 L, or 2 L bottle). Larger containers may have larger openings, such as a 200 L or 220 L drum may have a 5 cm opening. For use with this large size container, a spherical composition shape can have a diameter of about 10 mm, about 20 mm, about 30 mm, about 40 mm, about 50 mm, or ranges between any two of these values.

The multilayered electrolyte composition can further comprise one or more additional layers. For example, the composition can comprise a core layer, inert layer, disinfection layer, and 1, 2, 3, 4, 5, 6, 7, 8, or more additional layers. The composition can comprise all different layers (one of each type) or can comprise two or more of one type of layer. Each layer can fully or partially cover or coat the layer beneath it. For example, a layer can be a band shape, leaving a portion of the layer underneath it uncovered or uncoated.

For example, the multilayered electrolyte composition can further comprise a sealant layer coating the core layer. The sealant layer facially contacts the core layer and the inert layer, but not the disinfection layer. For example, the core layer will contact the sealant layer, the sealant layer will contact the core layer and the inert layer, and the inert layer will contact the sealant layer and the disinfection layer. The sealant layer can generally contain any sealant. Examples of sealants include shellac-based sealants and hydroxypropyl methylcellulose (HPMC). A cross-section line starting from the core center would contact the core layer, then the sealant layer, then the inert layer, then the disinfection layer.

In another example, the multilayered electrolyte composition can further comprise a moisture barrier layer coating the disinfection layer. The moisture barrier layer facially contacts the disinfection layer but not the inert layer or the core layer. In some examples, the moisture barrier layer is the outermost layer of the composition. The moisture barrier layer can generally contain any moisture barrier compounds. An example moisture barrier compound is polyvinyl alcohol (PVA). A cross-section line starting from the core center can contact the core layer, then the sealant layer, then the inert layer, then the disinfection layer.

The composition can further comprise a shell coating layer that facially contacts the disinfection layer but not the inert layer. The shell coating layer can be a candy coating layer. The candy coating layer can provide a hard shell outer surface to the composition.

In one example, the multilayered electrolyte composition can further comprise both a sealant layer and a moisture barrier layer. In this example, a cross-section line starting from the core center would contact the core layer, then the sealant layer, then the inert layer, then the disinfection layer, then the moisture barrier layer.

The outermost layer of the composition can further comprise a label or dye stamp. The label or dye stamp can indicate information such as the identity of the composition, instructions, warnings (such as not to be ingested), and so on.

In one specific example, a multilayered electrolyte composition can comprise a core layer, a sealant layer, an inert layer, a disinfection layer, and a moisture barrier layer, wherein: the core layer comprises sodium chloride, potassium chloride, trisodium citrate dihydrate, and a colored dye; the sealant layer comprises hydroxypropyl methylcellulose, the inert layer comprises glucose; the disinfection layer comprises sodium dichloroisocyanurate and an effervescent agent, and the moisture barrier layer comprises polyvinyl alcohol.

Methods of Preparing Multilayered Electrolyte Compositions

Many methods of preparing the above-described multilayered electrolyte compositions are described. The multilayered electrolyte compositions can be any of the multilayered electrolyte compositions described in the previous section.

An example method of preparing a multilayered electrolyte composition can comprise: providing a core layer composition comprising at least one citrate salt; providing an inert layer composition that does not chemically react with at least one water disinfection agent; providing a disinfection layer composition comprising the at least one water disinfection agent; forming a core layer from the core layer composition; applying the inert layer composition to form an inert layer; and applying the disinfection layer composition to form a disinfection layer.

The various coating steps can be performed by generally any methods. The applying steps can all be performed by the same method, or by two or more different methods. For example, applying the inert layer composition can be the same or different method from applying the disinfection layer composition. Example methods include spraying, dipping, candy coating, sugar coating, dry powder coating, coating using a hard panner, and coating using a perforated panner.

The method can further comprise one or more compressing steps. For example, the core layer can be compressed prior to applying the inert layer composition.

The method can further comprise one or more additional applying steps. For example, the method can further comprise applying a shell coating layer composition to form a shell coating layer. The shell coating layer can be a candy coating layer.

The various layers can be applied in various orders and with or without intermediate applying steps. For example, the applying the inert layer composition can be applied onto the core layer or onto the shell coating layer.

The method can further comprise applying a moisture barrier composition to form a moisture barrier layer. The applying the moisture barrier composition can be applied onto the disinfection layer, for example.

The method can further comprise sealing the multilayered electrolyte composition in at least one container. Examples of containers include a bottle, a bag, a pouch, a sachet, a shrink wrap plastic container, a vacuum sealed plastic container, a tube for holding individually packaged tablets, or a blister pack container.

Methods of Using Multilayered Electrolyte Compositions

Many methods of using the above-described multilayered electrolyte compositions are described. For example, a method of using a multilayered electrolyte composition can comprise: providing a multilayered electrolyte composition; and contacting the multilayered electrolyte composition with untreated water to form treated water; wherein: the multilayered electrolyte composition comprises a core layer, an inert layer, and a disinfection layer; the core layer comprises at least one citrate salt; the inert layer does not chemically react with at least one water disinfection agent; and the disinfection layer comprises the at least one water disinfection agent.

The ratio or amount of multilayered electrolyte composition contacting the untreated water can generally be any ratio or amount suitable to treat the untreated water. For example, the composition suitable for treating 1 liter of water can include about 3.5 mg of NaDCC (sodium dichloroisocyanurate to achieve a free chlorine residual concentration of about 7.0 mg/L for the first 30 minutes. Amounts can be scaled up or down according to the intended volume of untreated water to treat. For example, the amount for treating 1 liter of water can be about 3.5 mg, about 4 mg, about 5 mg, about 6 mg, about 7 mg, about 8 mg, about 9 mg, about 10 mg, and ranges between any two of these values.

The treated water can generally have any chlorine residual level after the disinfection layer dissolves but before the core layer dissolves. For example, the treated water can have a chlorine residual level of at least about 0.5 mg/L after the disinfection layer dissolves but before the core layer dissolves.

The untreated water can be contaminated or suspected of being contaminated. Contaminants can include bacteria, yeast, virus, or combinations thereof. For example, the untreated water can contain at least one microbe, at least one pathogen, or both. Not all microbes are pathogens, and vice versa. Examples of non-pathogenic microbes include *Aeromonas hydrophila, Brevundimonas vesicularis, Chromobacterium violaceum, Citrobacter youngae, Empedobacter brevis, Pantoea agglomerans, Pseudomonas putida,*

*Pseudomonas stutzeri*, and *Streptococcus mitis*. Examples of pathogens include *Vibrio cholerae, Escherichia coli* (ETEC, EHEC, all types or strains), *Staphylococcus aureus, Campylobacter species, Clostridium difficile, Salmonella* species (typhoidal and non-typhoidal), *Shigella* species, *Aeromonas, Entamoeba histolytica*, Enteric adenovirus, norovirus, rotavirus, *Giardia*, and *Cryptosporidium*.

In some examples, the untreated water has an untreated microbial level; the treated water has a treated microbial level; and the treated microbial level is at least 99% lower than the untreated microbial level. The reduction can be at least 99%, at least 99.9%, at least 99.99%, at least 99.999%, and ideally 100%.

In some examples, the untreated water has an untreated pathogen level; the treated water has a treated pathogen level; and the treated pathogen level is at least 99% lower than the untreated pathogen level. The reduction can be at least 99%, at least 99.9%, at least 99.99%, at least 99.999%, and ideally 100%.

The method can further comprise filtering the untreated water before the contacting step (sometimes called pre-filtering). This additional step may be beneficial if the untreated water contains or is suspected of containing suspended particulates, is turbid, or appears visually cloudy. Filtering can include paper filtration (such as through a coffee filter), mesh filtration, membrane filtration, charcoal filtration, microfiltration, ultrafiltration, ceramic filtration, block activated charcoal filtration, granular activated charcoal filtration, hollow cord filtration, sediment filtration, reverse osmosis filtration, distillation, or combinations thereof. Treatment of low turbidity water may be desirable.

The contacting step can generally be performed for any sufficient duration of time. For example, the contacting step can be performed for at least about 30 minutes. The contacting step can be performed at least until the multilayered electrolyte composition is fully dissolved in the untreated water. The contacting step can be performed for longer periods of time. The contacting step can be performed until detecting a color change in the treated water. The color change can be detected visually or by a detection instrument such as a UV/VIS spectrophotometer. The color change can result from at least one dye being present in the core layer, indicating that the core layer has dissolved.

The number of units of multilayered electrolyte compositions contacted with the untreated water can be one or more, depending on the volume of untreated water and the configuration of the multilayered electrolyte composition. For example, 1, 2, 3, 4, 5, 6, 7, 8, 9, 10, or more composition units can be added to the untreated water. For example, if the multilayered electrolyte composition is configured to treat 200 mL of untreated water, and 1 L of untreated water is to be treated, then five units of multilayered electrolyte compositions would be added. Similarly, if the multilayered electrolyte composition unit is configured to treat 500 mL of untreated water, and 500 mL of untreated water is to be treated, then one unit of multilayered electrolyte composition would be added.

The method can further comprise storing the treated water. The method can further comprise consuming the treated water. The consuming can be performed by generally any animal. The animal can be a human or non-human animal. Non-human animals include all vertebrates, for example, mammals and non-mammals, such as non-human primates, sheep, dogs, rats, cats, cows, horses, chickens, amphibians, and reptiles. Examples of mammals include non-human primates, sheep, dogs, cats, cows, and horses. In some examples, the consuming is performed by a human or humans.

EXAMPLES

Example 1: Preparation of Oral Rehydration Solution ("ORS")

An oral rehydration solution is prepared according to the following Table.

| Component | Grams per liter | % by weight |
| --- | --- | --- |
| Sodium chloride | 2.6 | 12.683 |
| Glucose, anhydrous | 13.5 | 65.854 |
| Potassium chloride | 1.5 | 7.317 |
| Trisodium citrate dihydrate | 2.9 | 14.146 |
| Total | 20.5 | 100.0 |

Example 2: Multilayered Tablet Composition

A core mixture (4.5 grams) was prepared by mixing 1.3 g sodium chloride, 0.75 g potassium chloride, 1.45 g trisodium citrate, and 1 g EMDEX Dextrate NF binding agent (EMDEX is a registered trademark of Emsland-Starke GmbH; Rosenberg, Germany, and commercially available from JRS Pharma, Rosenberg, Germany). The core mixture was used to form a cylinder having about 22 mm diameter.

An inert layer was created by combining equal mass of water and glucose together, and heating to 310-315 degrees F. (154-157 degrees C.). This heated mixture was used to coat the cylindrical core, resulting in a cylinder having less than 25 mm diameter, and having an additional 2-4 mm thick coating on the top and bottom of the cylinder. The water-glucose mixture was slightly cooled, and some was added to silicone molds in a two-step process to fully encapsulate the core. While the sugar coating layer was still slightly molten, a core tablet was placed in the mold. Additional water-glucose mixture was added to fully encapsulate the core. The side thickness of the glucose coating layer is about 3.5 mm.

The composition of the core cylinder coated with the glucose first coating layer was fully dissolved by immersing in water at room temperature within about 30 minutes.

The tablet was evaluated by adding it to a liter of room temperature water. Chlorine test strips were used to measure total chlorine and free chlorine. The results are shown in the following Table. It was observed that agitation by shaking or other similar methods was helpful to inactivate the chlorine in solution after 30 minutes. It was also noted that the total chlorine and free chlorine concentrations stayed sufficiently high for 30 minutes to be effective against any pathogens.

| Time (minutes) | Total chlorine (ppm) | Free chlorine (ppm) |
| --- | --- | --- |
| 5 | 10 | 10 |
| 10 | 10 | 10 |
| 15 | 10 | 10 |
| 20 | 10 | 10 |
| 25 | 10 | 10 |

-continued

| Time (minutes) | Total chlorine (ppm) | Free chlorine (ppm) |
|---|---|---|
| 30 (before shaking) | 10 | 10 |
| 31 (after shaking) | 0 | 0 |
| 35 | 0 | 0 |

Example 3: NADCC Coated Multilayered Tablet Composition

The core cylinder coated with the glucose first coating layer from Example 1 is further coated with a disinfection layer. A mixture of NaDCC (sodium dichloroisocyanurate; 3.5 mg), binder (EMDEX, 1 g), and an effervescent agent is prepared and used to apply a disinfection layer using a perforated panning machine.

The disinfection layer can be configured in different ways, such as a full coating, a layer on the top, bottom, or both, of the cylinder, at least one stripe around the cylinder, and so on.

Example 4: Candy Coated Multilayered Tablet Composition

The multilayered tablet composition from Example 2 can be further coated with a hard candy shell coating layer to provide added stability and increased shelf life.

A sugar coating machine (sometimes known as sugar panner or candy panner) can be used under normal conditions to place a hard candy outer shell on the tablet composition.

Example 5: Multilayered Tablet Compositions Having a Spherical Shape

The multilayered tablet composition of Examples 1 and 2 can be prepared with identical components but molded into a spherical shape. For example, conventional compression machines are used in the food and pharmaceutical industry to provide compacted spherical products. Each finished spherical multilayered tablet can have a diameter of about 10 mm to about 30 mm, with a diameter of about 19 mm to about 20 mm being attractive to easily fit through a standard water bottle opening.

Example 6: Multilayered Tablet Compositions Containing Amino Acids

The multilayered tablet composition of Examples 1 and 2 can be prepared, with the addition of leucine and tryptophan amino acids to the core mixture.

Example 7: Multilayered Tablet Compositions Containing Vitamins

The multilayered tablet composition of Examples 1 and 2 can be prepared, with the addition of Vitamin C to the core mixture.

Example 8: Multilayered Tablet Compositions Containing Amino Acids and Vitamins The multilayered tablet composition of Examples 1 and 2 can be prepared, with the addition of histidine and tyrosine amino acids and Vitamins B3 and B6 to the core mixture.

Example 9: Multilayered Tablet Compositions Containing Additional Layers

A multilayered tablet composition can be prepared according to Example 2, with the addition of a lubricant to the core mixture. Sodium stearyl fumarate will be used at about 0.5% to about 1.5% by weight.

The core layer can be coated with a sealant layer before coating with the inert sugar layer. The sealant layer can contain a VIVACOAT Seal (shellac-based sealant) or hydroxypropyl methylcellulose (HPMC). The sealant layer can be about 1% of the weight of the multilayered tablet composition and is applied to coat the surface of the core layer.

The disinfection layer can be coated with a moisture barrier layer. The moisture barrier layer is intended to improve shelf life and product stability. Polyvinyl alcohol (PVA) in an amount of about 2% to about 4% of the weight of the multilayered tablet composition can be used.

Example 10: Evaluation of Multilayered Tablet Compositions

The above-described multilayered tablet compositions gradually dissolve in water starting at the outermost layer and gradually dissolving towards the inner core layer. It is believed that once the inner core layer starts to dissolve, the trisodium citrate reacts with any hypochlorous acid derived from the NaDCC. This has the benefit of decreasing undesired byproducts and reducing bad taste and bad smell commonly associated with chlorine disinfection.

Example 11: Interaction Between Chlorine and Electrolytes

An experiment was performed to evaluate the effect of electrolytes on free chlorine levels in solution. Three different solutions were prepared in tap water: (a) chlorine only, (b) chlorine and sucrose, and (c) chlorine, sucrose, and electrolyte. The sucrose concentration was 10 g/L. The electrolyte concentrations were: 2.6 g/L sodium chloride, 1.5 g/L potassium chloride, and 2.9 g/L sodium citrate. Sodium dichloroisocyanurate was used as the chlorine source (an Aquatab was used containing 8.5 mg NaDCC; Medentech, Wexford, Ireland). Chlorine test strips were used to measure the chlorine concentration. Free chlorine levels in mg/L were determined at 0, 5, 15, and 30 minutes. Results are shown in the following Table.

| Time (minutes) | Chlorine only | Chlorine and sucrose | Chlorine, sucrose, and electrolyte |
|---|---|---|---|
| 0 | 0.25 | 0.25 | 0.25 |
| 5 | 10 | 10 | 10 |
| 15 | 10 | 10 | 0.25 |
| 30 | 10 | 10 | 0.25 |

These results show that sucrose does not have any detectable effect on free chlorine levels in aqueous solution. Conversely, the presence of electrolyte very rapidly and effectively reduces chlorine levels.

Example 12: Use of Multilayered Tablet Compositions in Outdoor Recreation

A backcountry hiker can fill a 500 mL water bottle with water from a stream. The nearby trailhead has a sign warning hikers not to drink untreated water. The hiker suspects that the water may have one or more pathogens and is therefore unsafe to drink in untreated form. The hiker can add a single multilayer tablet to the water bottle (each tablet is configured to treat 500 mL of water). Immediately the hiker will observe effervescent bubbles forming. After at least 30 minutes of waiting, the hiker will notice that the water has turned light pink in color due to the presence of a food-safe red dye (Allura Red AC dye) mixed into the core layer of the tablet. The visible change in color indicates that the water has been fully treated and is now safe to drink.

The hiker will safely drink the treated water. The hiker will observe no unpleasant aftertaste, unlike that observed during previous outings during which they used iodine tablets to treat water.

Example 13: Use of Multilayered Tablet Compositions in Cold Weather Outdoor Recreation A backcountry snowshoe hiker can no longer use their water filter after it froze. The hiker finds a mountain stream but suspects that the water may have one or more pathogens and is therefore unsafe to drink in untreated form. The hiker can add two multilayer tablets to a 1-liter water bottle (each tablet is configured to treat 500 mL of water). Immediately the hiker will observe effervescent bubbles forming. After at least 30 minutes of waiting, the hiker will notice that the water has turned light pink in color due to the presence of a food-safe red dye (Allura Red AC dye) mixed into the core layer of the tablet. The visible change in color indicates that the water has been fully treated and is now safe to drink.

The hiker will safely drink the treated water. The hiker will observe no unpleasant aftertaste, unlike that observed during previous outings during which they used iodine tablets to treat water.

Example 14: Use of Multilayered Tablet Compositions in Post-Disaster Situations A tropical region is hit with a natural disaster, making access to safe and treated water impossible. The local population is suffering from diarrhea, caused by consuming water contaminated with *Vibrio cholerae*, rotavirus, norovirus, or one of the many other infectious causes of acute watery diarrheal illnesses.

A standard 220-liter plastic drum of untreated water sourced from a nearby lake is treated with 22 large multilayered tablets. After 30 minutes the drum is opened, and a small sample of treated water is removed for visual analysis. The sample is light purple in color due to the presence of a food-safe purple dye (a combination of Brilliant Blue FCF and Allura Red AC dyes) mixed into the core layer of the tablet, indicating that the water is fully treated and is now safe to drink.

Example 15: Use of Multilayered Tablet Compositions in Outbreak Situations

A tropical region is experiencing a cholera outbreak due to contamination of the local water supply. A refugee is being treated in a clinic but wants to leave to treat her children at home. She is being treated with oral rehydration solution (ORS), but the clinic is the only location in the region with the ability to treat the water. She needs to continue hydrating herself as she recovers from cholera and also to avoid drinking contaminated water again and suffer from reinfection at home.

She can add one multilayered tablet to a 1-liter water bottle. Immediately she will observe effervescent bubbles forming. After at least 30 minutes of waiting, she will notice that the water has turned light pink in color due to the presence of a food-safe red dye (Allura Red AC dye) mixed into the core layer of the tablet. The visible change in color indicates that the water has been fully treated and is now safe to drink. She will be able to care for her children and not experience cholera reinfection.

Example 16: Use of Multilayered Tablet Compositions in International Travel

A traveler visits rural Southeast Asia and does not have access to UV-sterilized bottled water. The traveler is informed that the tap water may have enterotoxigenic *E. coli* (ETEC) and may cause traveler's diarrhea ("Montezuma's revenge") and is therefore not advisable to drink.

The traveler fills a 2-liter plastic bottle with tap water and adds two multilayered tablets to the bottle (each tablet is configured to treat 1,000 mL of water). The traveler observes effervescent bubbles forming and waits until the water has turned light blue in color due to the presence of a food-safe blue dye (Brilliant Blue FCF dye) mixed into the core layer of the tablet. The visible change in color indicates that the water is fully treated and is now safe to drink.

The traveler will safely drink the water during the trip. The traveler will not worry about running out of batteries like when they carried a battery-powered UV sterilizer on a previous trip.

Example 17: Use of Multilayered Tablet Compositions in International Travel

An international traveler is suffering from diarrhea, likely caused by drinking water contaminated with enterotoxigenic *E. coli* (ETEC) after he ran out of bottled water. He is dehydrated from the loss of bodily fluids and needs to begin replacing those fluids without consuming more contaminated water.

The traveler fills a 1-liter plastic bottle with tap water and adds two multilayered tablets to the bottle (each tablet is configured to treat 500 mL of water). The traveler observes effervescent bubbles forming and waits until the water has turned light blue in color due to the presence of a food-safe blue dye (Blue *spirulina* powder) mixed into the core layer of the tablet. The visible change in color indicates that the water is fully treated and is now safe to drink.

Example 18: Use of Multilayered Tablet Compositions in International Travel

An international traveler is suffering from food poisoning caused by dinner she ate earlier that evening. She does not have any bottled beer or carbonated beverages, and only has access to untreated tap water. She needs to rehydrate herself to replace the fluids lost from vomiting.

The traveler fills a 500 mL stainless steel bottle with tap water and adds one multilayered tablet to the bottle (each tablet is configured to treat 500 mL of water). The traveler observes effervescent bubbles forming and waits at least 30 minutes for the tablet to fully dissolve in the water. The water is fully treated and is now safe to drink.

What is claimed is:

1. A multilayered electrolyte composition comprising a core layer, an inert layer, and a disinfection layer, wherein:
the core layer comprises at least one citrate salt;
the inert layer comprises a component that does not chemically react with at least one water disinfection agent; and
the disinfection layer comprises the at least one water disinfection agent, wherein at least one water disinfection agent is chlorine dioxide.

2. The composition of claim 1, wherein the disinfection layer fully coats the inert layer.

3. The composition of claim 1, wherein the at least one citrate salt is selected from monosodium citrate, disodium citrate, trisodium citrate, or combinations thereof.

4. The composition of claim 1, wherein the inert layer comprises at least one sugar.

5. The composition of claim 4, wherein the at least one sugar is selected from glucose, sucrose, fructose, galactose, or combinations thereof.

6. The composition of claim 1, wherein the disinfection layer further includes sodium dichloroisocyanurate, sodium hypochlorite, or combinations thereof.

7. The composition of claim 1, wherein the core layer further comprises at least one colored dye.

8. The composition of claim 7, wherein the at least one colored dye is selected from FD&C Blue No. 1-Brillian Blue FCF, E133 (blue shade), FD&C Blue No. 2-Indigotine, E132 (indigo shade), FD&C Green No. 3-Fast Green FCF, E143 (turquoise shade), FD&C Red No. 40-Allura Red AC, E129 (red shade), FD&C Yellow No. 5-Tartrazine, E102 (yellow shade), FD&C Yellow No. 6-Sunset Yellow FCF, E110 (orange shade), or combinations thereof.

9. The composition of claim 1, wherein the core layer further comprises at least one effervescent agent.

10. The composition of claim 9, wherein the at least one effervescent agent is selected from adipic acid, sodium bicarbonate, citric acid, malic acid, tartaric acid, fumaric acid, sodium bicarbonate, sodium carbonate, potassium carbonate, and arginine carbonate, or combinations thereof.

11. The composition of claim 1, wherein the core layer is cylindrical, spherical, oblong, or spheroid in shape.

12. The composition of claim 1, further comprising a sealant layer that facially contacts the core layer and the inert layer, and does not contact the disinfection layer.

13. The composition of claim 1, further comprising a moisture barrier layer that facially contacts the disinfection layer, and does not contact the inert layer or the core layer.

14. A multilayered electrolyte composition comprising:
a core layer comprising at least one citrate salt and at least one colored dye;
a disinfection layer comprising at least one water disinfection agent; and
an inert layer comprising a component that does not chemically react with at the least one water disinfection agent,
wherein the at least one colored dye is selected from FD&C Blue No. 1-Brillian Blue FCF, E133 (blue shade), FD&C Blue No. 2-Indigotine, E132 (indigo shade), FD&C Green No. 3-Fast Green FCF, E143 (turquoise shade), FD&C Red No. 40-Allura Red AC, E129 (red shade), FD&C Yellow No. 5-Tartrazine, E102 (yellow shade), FD&C Yellow No. 6-Sunset Yellow FCF, E110 (orange shade), or combinations thereof.

15. A multilayered electrolyte composition comprising a core layer, a sealant layer, an inert layer, a disinfection layer, and a moisture barrier layer, wherein:
the core layer comprises sodium chloride, potassium chloride, trisodium citrate dihydrate, and a colored dye;
the sealant layer comprises hydroxypropyl methylcellulose (HPMC);
the inert layer comprises glucose;
the disinfection layer comprises chlorine dioxide and an effervescent agent; and
the moisture barrier layer comprises polyvinyl alcohol (PVA).

16. A method of using a multilayered electrolyte composition, the method comprising:
providing a multilayered electrolyte composition; and
contacting the multilayered electrolyte composition with untreated water to form treated water;
wherein:
the multilayered electrolyte composition comprises a core layer, an inert layer, and a disinfection layer;
the core layer comprises at least one citrate salt;
the inert layer comprises a component that does not chemically react with at least one water disinfection agent; and
the disinfection layer comprises the at least one water disinfection agent, wherein the at least one water disinfection agent is chlorine dioxide.

17. The method of claim 16, wherein the at least one water disinfection agent is present in an amount sufficient to achieve a free chlorine residual concentration of about 7.0 mg/L for the first 30 minutes.

18. The method of claim 16, wherein the treated water has a chlorine residual level of at least about 0.5 mg/L after the disinfection layer dissolves but before the core layer dissolves.

19. The method of claim 16, wherein:
the untreated water has an untreated pathogen level;
the treated water has a treated pathogen level; and
the treated pathogen level is at least 99% lower than the untreated pathogen level.

20. The method of claim 16, wherein the untreated water comprises a pathogen selected from *Vibrio cholerae, Escherichia coli, Staphylococcus aureus, Campylobacter species, Clostridium difficile*, typhoidal *Salmonella* species, non-typhoidal *Salmonella* species, *Shigella* species, *Aeromonas, Entamoeba histolytica*, Enteric adenovirus, norovirus, rotavirus, *Giardia, Cryptosporidium*, or combinations thereof.

21. A method of using a multilayered electrolyte composition, the method comprising:
providing a multilayered electrolyte composition; and
contacting the multilayered electrolyte composition with untreated water to form treated water;
wherein:
the multilayered electrolyte composition comprises a core layer, a sealant layer, an inert layer, a disinfection layer, and a moisture barrier layer, wherein:
the core layer comprises sodium chloride, potassium chloride, trisodium citrate dihydrate, and a colored dye;
the sealant layer comprises hydroxypropyl methylcellulose (HPMC);
the inert layer comprises glucose;
the disinfection layer comprises chlorine dioxide and an effervescent agent; and
the moisture barrier layer comprises polyvinyl alcohol (PVA).

22. The method of claim 21, wherein the at least one water disinfection agent is present in an amount sufficient to achieve a free chlorine residual concentration of about 7.0 mg/L for the first 30 minutes.

23. The method of claim 21, wherein the treated water has a chlorine residual level of at least about 0.5 mg/L after the disinfection layer dissolves but before the core layer dissolves.

24. The method of claim 21, wherein:
the untreated water has an untreated pathogen level;
the treated water has a treated pathogen level; and
the treated pathogen level is at least 99% lower than the untreated pathogen level.

25. The method of claim 21, wherein the untreated water comprises a pathogen selected from *Vibrio cholerae, Escherichia coli, Staphylococcus aureus, Campylobacter species, Clostridium difficile*, typhoidal *Salmonella* species, non-typhoidal *Salmonella* species, *Shigella* species, *Aeromonas, Entamoeba histolytica*, Enteric adenovirus, norovirus, rotavirus, *Giardia, cryptosporidium*, or combinations thereof.

* * * * *